United States Patent [19]
Ricks et al.

[11] Patent Number: 5,681,052
[45] Date of Patent: Oct. 28, 1997

[54] COMPACT AIRBAG INSTALLATION

[75] Inventors: Merle K. Ricks, Layton; Matt D. Malone, Hooper; Roger T. Lee, Willard; David A. Stites, Ogden, all of Utah

[73] Assignee: Morton International, Inc., Chicago, Ill.

[21] Appl. No.: 746,126

[22] Filed: Nov. 6, 1996

[51] Int. Cl.⁶ .................................................. B60R 21/20
[52] U.S. Cl. ................................. 280/743.1; 280/731
[58] Field of Search ............................ 280/743.1, 731, 280/730.2, 728.1

[56] References Cited

U.S. PATENT DOCUMENTS

| | | | |
|---|---|---|---|
| 4,004,828 | 1/1977 | Sogabe et al. | 280/743 |
| 4,877,264 | 10/1989 | Cuevas | 280/731 |
| 5,140,799 | 8/1992 | Satoh | 53/429 |
| 5,215,795 | 6/1993 | Matsumoto et al. | 428/36.1 |
| 5,280,952 | 1/1994 | Hirabayashi et al. | 280/739 R |
| 5,340,151 | 8/1994 | Sato | 280/743.1 |
| 5,364,126 | 11/1994 | Kuretake et al. | 280/739 |
| 5,425,552 | 6/1995 | Linder | 280/743.1 |
| 5,478,113 | 12/1995 | Rogers | 280/743.1 |
| 5,482,317 | 1/1996 | Nelsen et al. | 280/743.1 |
| 5,492,367 | 2/1996 | Albright et al. | 280/743.1 |
| 5,520,408 | 5/1996 | Niederman | 280/728.1 |
| 5,529,339 | 6/1996 | Niederman | 280/743.1 |
| 5,531,476 | 7/1996 | Kerner | 280/743.1 |
| 5,547,218 | 8/1996 | Kuretake et al. | 280/743.1 |
| 5,560,643 | 10/1996 | Lang et al. | 280/728.2 |

FOREIGN PATENT DOCUMENTS

| | | | |
|---|---|---|---|
| 4111059 | 10/1991 | Germany | 280/743.1 |
| 63-212147 | 9/1988 | Japan | B60R 21/20 |
| 2-279441 | 11/1990 | Japan | B60R 21/20 |
| 4-368251 | 12/1992 | Japan | B60R 21/20 |
| 6270817 | 9/1994 | Japan | 280/731 |
| 2269789 | 2/1994 | United Kingdom . | |

*Primary Examiner*—Christopher P. Ellis
*Attorney, Agent, or Firm*—George W. Rauchfuss, Jr.; Gerald K. White

[57] ABSTRACT

A driver's side airbag module of reduced thickness includes a housing, a cylindrical inflator, and a folded airbag. The airbag is first folded into a rectangle and the ends of the rectangle are thereafter folded or rolled to lie between the periphery of the inflator and the side walls of the housing. The thickness of the resulting module is not substantially greater than the height of the inflator.

6 Claims, 2 Drawing Sheets

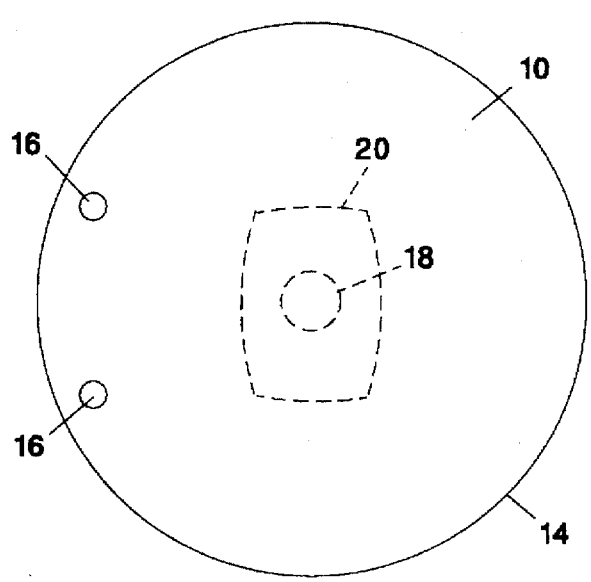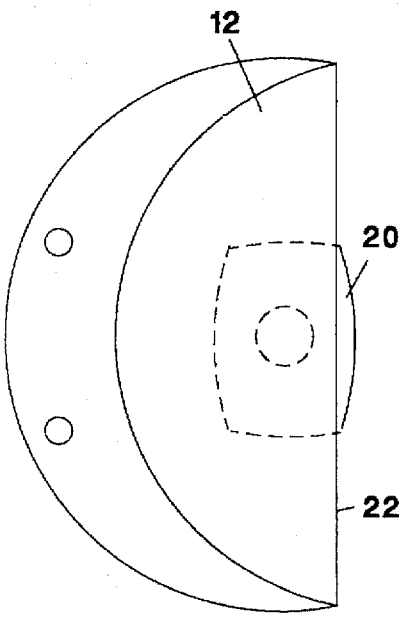
FIG. 1  FIG. 2
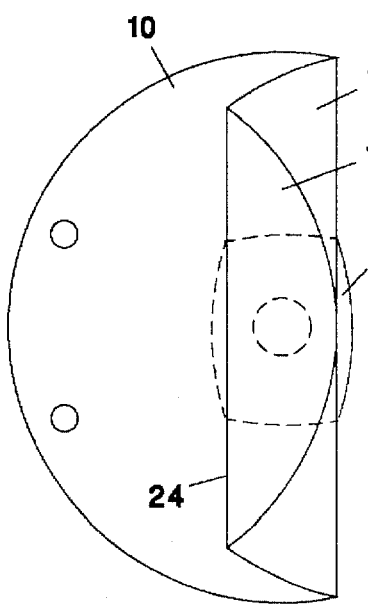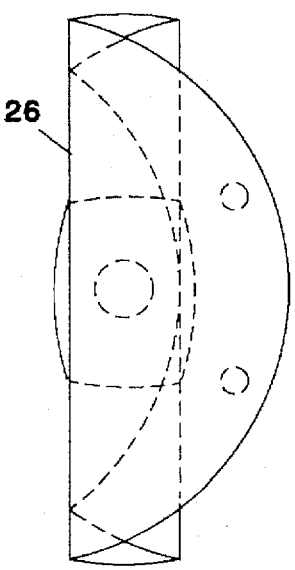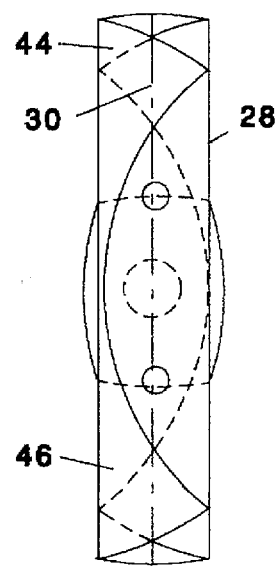
FIG. 3  FIG. 4  FIG. 5

COMPACT AIRBAG INSTALLATION

TECHNICAL FIELD

This invention relates to the field of automotive airbags. More particularly, it pertains to a uniquely folded airbag having minimal space requirements.

BACKGROUND ART

A driver's side automotive airbag is conventionally mounted within a steering wheel. It comprises a housing within which is mounted a cylindrical inflator which is actuated upon the occurrence of a crash to produce inflating gas. Also mounted within the housing is an airbag which is formed of two circular panels which are sewn together around their circumferences. One of the panels has a central opening which is connected to receive gas from the inflator.

In such a conventional installation, the deflated airbag is folded so that it lies, in large part, over the cylindrical inflator. The resulting module is, accordingly, relatively thick—requiring the steering wheel to be constructed with a relatively deep internal depression to receive the module. It would be desirable to provide a thinner module, thereby allowing use of a steering wheel of smaller proportions.

Another problem with the prior art installations is that the position of the airbag over the inflator causes it to be propelled directly toward the driver upon inflation. If the driver is too close to the steering wheel at the time of inflation this may cause injury. It would be desirable for the airbag to be inflated in an outward direction at the same time it is being propelled inwardly of the automobile, thereby providing a less forceful but more widely distributed cushion.

Accordingly it is a primary object of the present invention to provide an automotive driver's side airbag installation which is substantially thinner than those of the prior art. Another object is to provide such an installation wherein the airbag may be more evenly inflated. Other objects, features, and advantages will become apparent from the following description and appended claims.

DISCLOSURE OF INVENTION

The invention comprises a housing within which is mounted a cylindrical inflator. A deflated circular airbag has an opening which is mounted to receive gas from the inflator. The deflated airbag is folded in such a manner that it is primarily located around the periphery of the inflator and within the housing sidewalls.

BRIEF DESCRIPTION OF DRAWINGS

FIG. 1 is a plan view of a deflated airbag positioned over the housing and inflator;

FIG. 2 illustrates a first fold of the airbag of FIG. 1;

FIG. 3 illustrates a second fold of the airbag of FIG. 1;

FIG. 4 illustrates a third fold of the airbag of FIG. 1;

FIG. 5 illustrates a fourth fold of the airbag of FIG. 1;

BEST MODE FOR CARRYING OUT THE INVENTION

Figure 6:
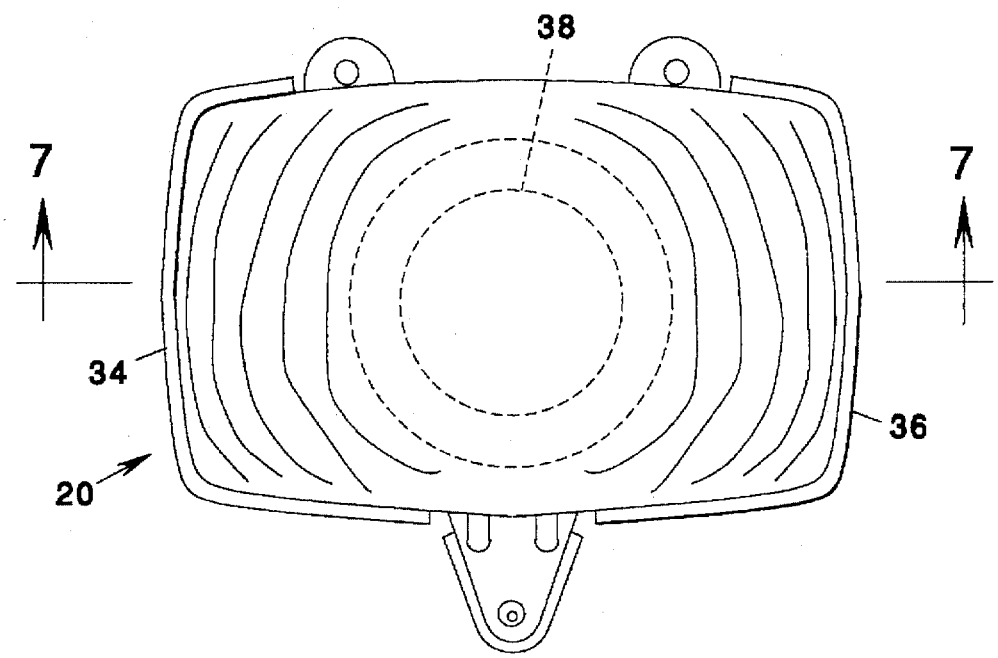
FIG. 6 is a plan view of an airbag housing enclosing a fully folded airbag in accordance with the invention.

FIGS. 1–5 illustrate a conventional driver's side airbag of fabric, or other suitable material, comprising a circular top panel 10 and a circular bottom panel 12. These panels are joined, as by stitching, around their circumferences 14. The top panel 10 may include vent holes 16 for permitting rapid deflation after a crash. The bottom panel 10 includes a central opening 18 for receiving inflating gas from an inflator mounted within a housing 20. Everything thus far described is conventional and, accordingly, need not be further described.

The novelty of this invention resides in the manner in which the airbag is folded. However, the first folds as illustrated in FIGS. 2–5 are also conventional. The first fold as illustrated in FIG. 2 involves doubling a large but minor portion of the airbag over onto itself along a first fold line 22 which lies within the side of the housing 20. A second fold illustrated in FIG. 3 is made along a second foldline 24 which lies within the opposite side of the housing 20. Thereafter, the remaining portion of the airbag is folded along a third foldline 26 which is essentially co-linear with the second foldline 24. Thereafter the first folding stage is completed by a fourth foldline 28 which is essentially co-linear with the first foldline 22. The resulting airbag congregation, as illustrated in FIG. 5, is in the form of a rectangle which lies along a central axis 30 which forms a diameter of the unfolded airbag. The ends of the rectangle extend beyond the housing 20, its width being receivable in the housing.

Figure 7:
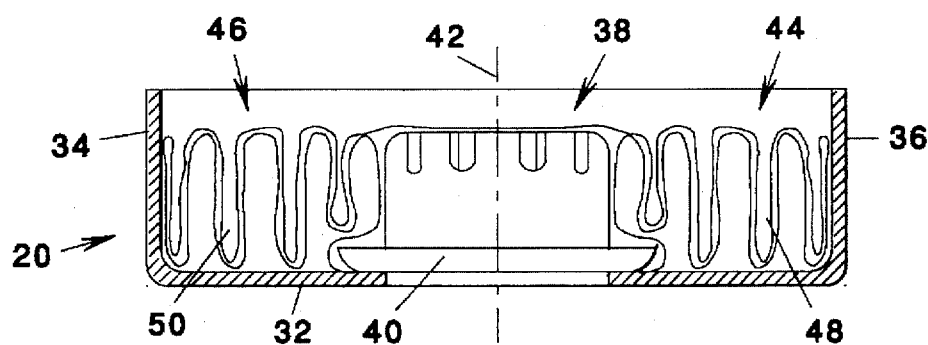
FIG. 7 is a cross-section taken substantially along the line 7—7 of FIG. 6.

FIGS. 6 and 7 illustrate in more detail the final folding of the airbag. In these figures the housing 20 is, as illustrated, substantially rectangular and has a base 32 surrounded by sidewalls 34, 36. Mounted within the housing 20 is a cylindrical inflator 38. The inflator 38 includes an airbag retaining ring 40 which dampingly engages the airbag opening 18. The inflator 38 is essentially in the form of a right circular cylinder having an axis of rotation 42 which is substantially perpendicular to the base 32. Everything thus far described is conventional, other than the fact that the height of the sidewalls 34, 36 may be less than those of a standard housing. This is due to the fact that the two ends 44, 46 of the rectangularly folded airbag illustrated in FIG. 5 are folded into the space between the inflator and the housing sidewall as illustrated in FIG. 7. As illustrated therein, the one end 44 is folded into the space between the inflator 38 and the sidewall 36 in the form of vertical pleats 48 which are substantially parallel to the axis of rotation of cylindrical inflator 38. The opposite and 46 of the airbag is similarly folded into the space between the inflator 38 and the sidewall 34 by means of similar vertical pleats 50.

As a result of this unique folding pattern, k will be noted that the height of the housing may be essentially no greater than the height of the inflator 38, thereby resulting in a much reduced space requirement for housing the airbag module. It will be understood that a completed installation will include a cover with tearlines. However, as this is conventional, it is not illustrated. A further advantage of the airbag folded as illustrated in FIG. 7 is that, as inflation begins, the airbag will not only advance upwardly as viewed in FIG. 7 but also outwardly nearly simultaneously as a result of the unfolding of the pleats 48, 50, thereby reducing the propulsive force while expanding the coverage of the airbag.

Figure 8:
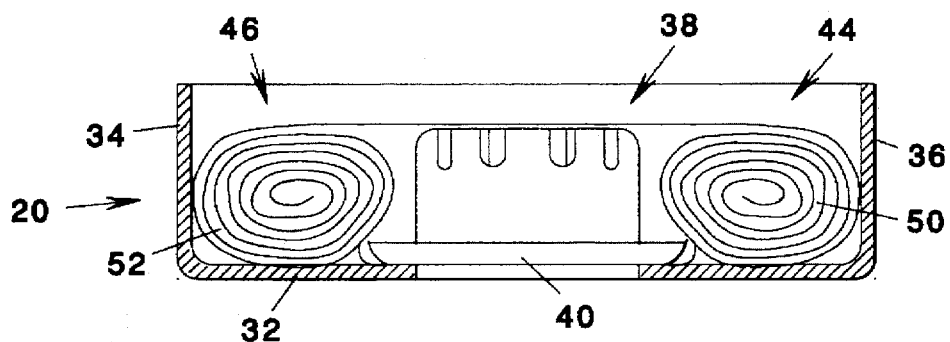
FIG. 8 is a view similar to FIG. 7 illustrating another embodiment of the invention.

FIG. 8 illustrates a modification of this invention. In this modification, each end 44, 46 of the rectangularly folded airbag of FIG. 5 is formed into a roll 50, 52. These rolls have the same space advantage as the folds of FIG. 7 and also unfold in a similar manner.

It is believed that the many advantages of this invention will now be apparent to those skilled in the art. It will also be apparent that a number of variations and modifications may be made therein without departing from its spirit and scope. Accordingly, the foregoing description is to be construed as illustrative only, rather than limiting. This invention is limited only by the scope of the following claims.

We claim:

1. A method of folding a deflated automotive airbag formed from first and second substantially circular panels joined at their circumferences, one of said panels having a central opening connected to receive gas from a substantially cylindrical inflator mounted within a generally rectangular housing comprising a base and at least one sidewall, the inflator having an axis of rotation substantially perpendicular to the base of said housing, said method comprising:

folding said airbag into a first configuration substantially in the form of a rectangle lying along a central axis forming a diameter of said unfolded airbag, said rectangle having first and second ends extending beyond said housing, the width of said rectangle being substantially receivable within said housing; and folding each of said first and second ends of said rectangle in vertical pleats formed substantially parallel to the axis of rotation of said inflator to lie within said housing adjacent said inflator and said at least one sidewall of the housing, such that the height of the folded airbag and vertical pleats thereof within said housing do not substantially exceed the height of said inflator.

2. The method of claim 1 wherein said first configuration is achieved by:

successively folding a first half of said airbag to lie along said central axis; and successively folding the second half of said airbag to overlie said first half along said central axis.

3. A driver's side airbag module which comprises:

a substantially rectangular housing including a base and one or more sidewalls surrounding said base;

a right circular cylindrical inflator centrally contained within said housing, mounted on said base, spaced from said sidewalls, and having an axis of rotation perpendicular to said base;

an airbag formed of first and second substantially circular panels joined at their circumferences, one of said panels having a central opening connected to receive inflating gas from said inflator, said airbag being folded into a substantially elongated rectangle having first and second ends, each end being folded in vertical pleats substantially parallel to the axis of rotation of the inflator and lying within a space between a different opposed diametrical side of said inflator and one of said sidewalls and adjacent said inflator.

4. A method of folding a deflated automotive airbag formed from first and second substantially circular panels joined at their circumferences, one of said panels having a central opening connected to receive gas from a substantially cylindrical inflator mounted within a generally rectangular housing comprising a base and at least one sidewall, the inflator having an axis of rotation substantially perpendicular to the base of the housing, said method comprising:

folding said airbag into a first configuration substantially in the form of a rectangle lying along a central axis forming a diameter of said unfolded airbag, said rectangle having first and second ends extending beyond said housing, the width of said rectangle being substantially receivable within said housing;

rolling each of said first and second ends of said rectangle toward the central opening to form a roll to be within the housing adjacent said inflator and said at least one sidewall of the housing, such that the length of the folded airbag and rolls thereof within said housing do not substantially exceed the height of said inflator.

5. The method of claim 4 wherein said first configuration is achieved by:

successively folding a first half of said airbag to lie along said central axis; and successively folding the second half of said airbag to overlie said first half along said central axis.

6. A driver's side airbag module which comprises:

a substantially rectangular housing including a base and one or more sidewalls surrounding said base;

a right circular cylindrical inflator centrally contained within said housing, mounted on said base, spaced from said sidewalls, and having an axis of rotation perpendicular to said base;

an airbag formed of first and second substantially circular panels joined at their circumferences, one of said panels having a central opening connected to receive inflating gas from said inflator, said airbag being folded into a substantially elongated rectangle having first and second ends, each end of said rectangle being rolled into a roll lying within a space between a different opposed diametrical side of said inflator and one of said sidewalls and adjacent said inflator.

* * * * *